US012750567B2

(12) United States Patent
Micheli et al.

(10) Patent No.: US 12,750,567 B2
(45) Date of Patent: Sep. 29, 2026

(54) SYSTEM AND METHOD FOR DIGITAL COMMUNICATION

(71) Applicant: Viral Nation Inc., Mississauga (CA)

(72) Inventors: Mathew Micheli, Kleinburg (CA); Manminder Kandola, Oakville (CA)

(*) Notice: Subject to any disclaimer, the term of this patent is extended or adjusted under 35 U.S.C. 154(b) by 100 days.

(21) Appl. No.: 18/810,123

(22) Filed: Aug. 20, 2024

(65) Prior Publication Data

US 2025/0071394 A1 Feb. 27, 2025

Related U.S. Application Data

(60) Provisional application No. 63/520,718, filed on Aug. 21, 2023.

(51) Int. Cl.
*H04N 21/854* (2011.01)
*H04N 21/2743* (2011.01)

(52) U.S. Cl.
CPC ....... *H04N 21/854* (2013.01); *H04N 21/2743* (2013.01)

(58) Field of Classification Search
CPC ............. H04N 21/854; H04N 21/2743; G06Q 30/0244; G06Q 30/0277; G06Q 30/0276
See application file for complete search history.

(56) References Cited

U.S. PATENT DOCUMENTS

| | | | | |
|---|---|---|---|---|
| 11,516,158 | B1 | 11/2022 | Luzhnica et al. | |
| 2018/0040029 | A1* | 2/2018 | Zeng | G06Q 30/0277 |
| 2020/0142999 | A1 | 5/2020 | Pedersen | |
| 2021/0150541 | A1* | 5/2021 | Gurbuxani | G06Q 30/0185 |

OTHER PUBLICATIONS

European Patent Office, Extended European Search Report for EP Patent Application No. 24195612.7, Nov. 6, 2024.
Mondragon et al,: "Adaptive contents for interactive TV guided by machine learning based on predictive sentiment analysis of data", Soft Computing, Mar. 7, 2017, pp. 2731-2752, vol. 22.

* cited by examiner

*Primary Examiner* — Alazar Tilahun
(74) *Attorney, Agent, or Firm* — Own Innovation Inc.; James W. Hinton; Osman Ismaili

(57) ABSTRACT

Provided is a system and method for generating and posting tailored digital content. The system includes a processor and memory. The memory is configured to store campaign data and model data. The processor includes a goals and objectives module configured to apply goals application data to a goals application model, and generate and provide to a recommendations module goals and objectives data. The processor further includes the recommendations module configured to apply the goals and objectives data and creative feedback to a recommendations model, generate and provide to a creations module, the recommendations data including an engineered prompt, and update the recommendations model based on received creative feedback. The processor further includes an evaluation module configured to receive and evaluate the status of creative data, and where the creative data is in progress, generate and provide to the recommendations modules, the creative feedback.

20 Claims, 5 Drawing Sheets

SYSTEM AND METHOD FOR DIGITAL COMMUNICATION

TECHNICAL FIELD

The following relates generally to digital communication particularly a system and method for generating and posting tailored digital communication and content.

INTRODUCTION

Digital communication has tremendously expanded the reach and platforms of conventional communication. This capability and capacity enables communication to be pervasive. However, this greater capability and capacity provides so many opportunities to communicate that the content and resources required to take advantage of these opportunities is far greater than that of conventional systems. Furthermore, the variety of different digital communication methods, platforms, and channels provides formatting and presentation options beyond that of conventional systems. For example, a communication source, such as a business owner, may manage communication on a business website, multiple social media platforms, and direct messaging communication channels by directing resources away from the core productivity of the business. By way of illustrative example and without limitation, social media platforms may include Instagram™, Twitter™, Pinterest™, and Facebook™. By way of further illustrative example and also without limitation, direct messaging communication channels may include email, short message service (SMS), various instant messaging channels such as WhatsApp® or messaging functions and applications embedded in other platforms such as shopping or gaming sites, etc.

As these opportunities and options greatly surpass those of conventional communication methods and systems, the resources required to realize these opportunities and options in a meaningful and quality manner are also far greater. In this environment there is also a strong potential for digital communication to become noise rather than effectively communicate an intended message or elicit a desired response. Avoiding this noise places a burden on those who seek to optimize the effectiveness of their communication in a digital environment.

Artificial intelligence (AI) systems are increasingly being used to mitigate this burden. For example, a user may interface with an AI system to generate and adapt communication content. While the AI systems may assist in generating the communication content, this advantage may be mitigated or overcome by difficulties in providing the goals to the AI system. The experience of engaging an AI system may be similar to two people speaking different but related languages. Given this communication barrier, initial attempts may produce undesirable results. It may take many attempts and/or specific training with the AI system to obtain satisfactory results and even more to obtain optimal ones. In addition to the spent resources, this causes frustration and undermines trust in the system's ability to contribute efficiency to the communication.

Furthermore, even when goals of the user can be sufficiently provided to the AI system, conventional general AI models lack the training and focus to determine and generate an effective communication approach and implement such an approach. For example, AI models may provide predictable or generic communication content such as stock photos. This communication can be ineffective and even detrimental by indicating a lack of effort.

Accordingly, apparatuses and methods for focusing and expediting digital content generation and posting are desired which overcome conventional digital communication approaches.

SUMMARY

Provided is a system for generating and posting tailored digital content. The system includes a memory configured to store a campaign data and model data comprising a goals application model, and a recommendations model. The system further includes a processor communicatively connected to the memory. The processor includes a goals and objectives module configured to acquire and apply goals application data to a goals application model, generate goals and objectives data via the goals application model based on the applied goals application data and provide the goals and objectives data to a recommendations module. The processor further includes the recommendations module configured to receive and apply the goals and objectives data and, where provided, a creative feedback to a recommendations model, generate a recommendations data via the execution of the recommendations model based on the applied goals data and, where received, the creative feedback, the recommendations data comprising at least one engineered prompt, provide the recommendations data to a creations module and where a creative feedback is received, dynamically update the recommendations model based on the creative feedback. The processor further includes an evaluation module configured to receive a creative data from the creations module, evaluate the creative data to determine a status of the creative data wherein the status indicates if a creative data is in progress and where the status indicates that the creative data is progress, generate and provide to the recommendations modules, the creative feedback based on the status.

In an embodiment, the campaign data includes at least one of: the goals application data; the goals and objectives data; recommendations data; and creative feedback data.

In an embodiment, the model data includes at least one of: the goals application model; and the recommendations model.

In an embodiment, the processor further comprises a posting module configured to post creative content.

In an embodiment, the processor further comprises an onboarding module configured to onboard a client.

In an embodiment, the processor further comprises an acquisition module configured to acquire data from various sources.

In an embodiment, the acquisition module includes a preprocessing module configured to preprocess data acquired by the acquisition module.

In an embodiment, the processor further comprises a campaign evaluation module configured to evaluate the success of a campaign, generate corresponding success data, and provide the success data to the goals and objectives module.

A method for generating and posting tailored digital content is provided. The method includes executing via a computer system comprising at least one processor: acquiring and applying goals application data to a goals application model; generating goals and objectives data via the goals application model based on the applied goals application data; providing the goals and objectives data to a recommendations module; receiving and applying the goals and objectives data and, where provided, a creative feedback to a recommendations model; generating a recommendations data via the execution of the recommendations model based on the applied goals data and, where received, the creative feedback, the recommendations data comprising at least one engineered prompt; providing the recommendations data to a creations module; where a creative feedback is received, dynamically updating the recommendations model based on the creative feedback; receiving a creative data from the creations module; evaluating the creative data to determine a status of the creative data wherein the status indicates if a creative data is in progress; and where the status indicates that the creative data is progress, generating and providing to the recommendations modules, the creative feedback based on the status.

In an embodiment, the method further includes posting creative content.

In an embodiment, the method further includes onboarding a client.

In an embodiment, the method further includes acquiring data from various sources.

In an embodiment, the method further includes preprocessing data acquired.

In an embodiment, the method further includes evaluating the success of a campaign, generating corresponding success data, and providing the success data to the goals and objectives module.

A device is provided. The device includes a network interface, a processor, and a non-transitory memory having stored thereon computer-executable instructions which, when executed by the processor, configure the device to: acquire and apply goals application data to a goals application model; generate goals and objectives data via the goals application model based on the applied goals application data; provide the goals and objectives data to a recommendations module; receive and apply the goals and objectives data and, where provided, a creative feedback to a recommendations model; generate a recommendations data via the execution of the recommendations model based on the applied goals data and, where received, the creative feedback, the recommendations data comprising at least one engineered prompt; provide the recommendations data to a creations module; where a creative feedback is received, dynamically update the recommendations model based on the creative feedback; receive a creative data from the creations module; evaluate the creative data to determine a status of the creative data wherein the status indicates if a creative data is in progress; and where the status indicates that the creative data is progress, generate and provide to the recommendations modules, the creative feedback based on the status.

In an embodiment, the device is further configured to post creative content. In an embodiment, the device is further configured to onboard a client.

In an embodiment, the device is further configured to acquire data from various sources.

In an embodiment, the device is further configured to preprocess data acquired.

In an embodiment, the device is further configured to evaluate the success of a campaign, generate corresponding success data, and provide the success data to the goals and objectives module.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
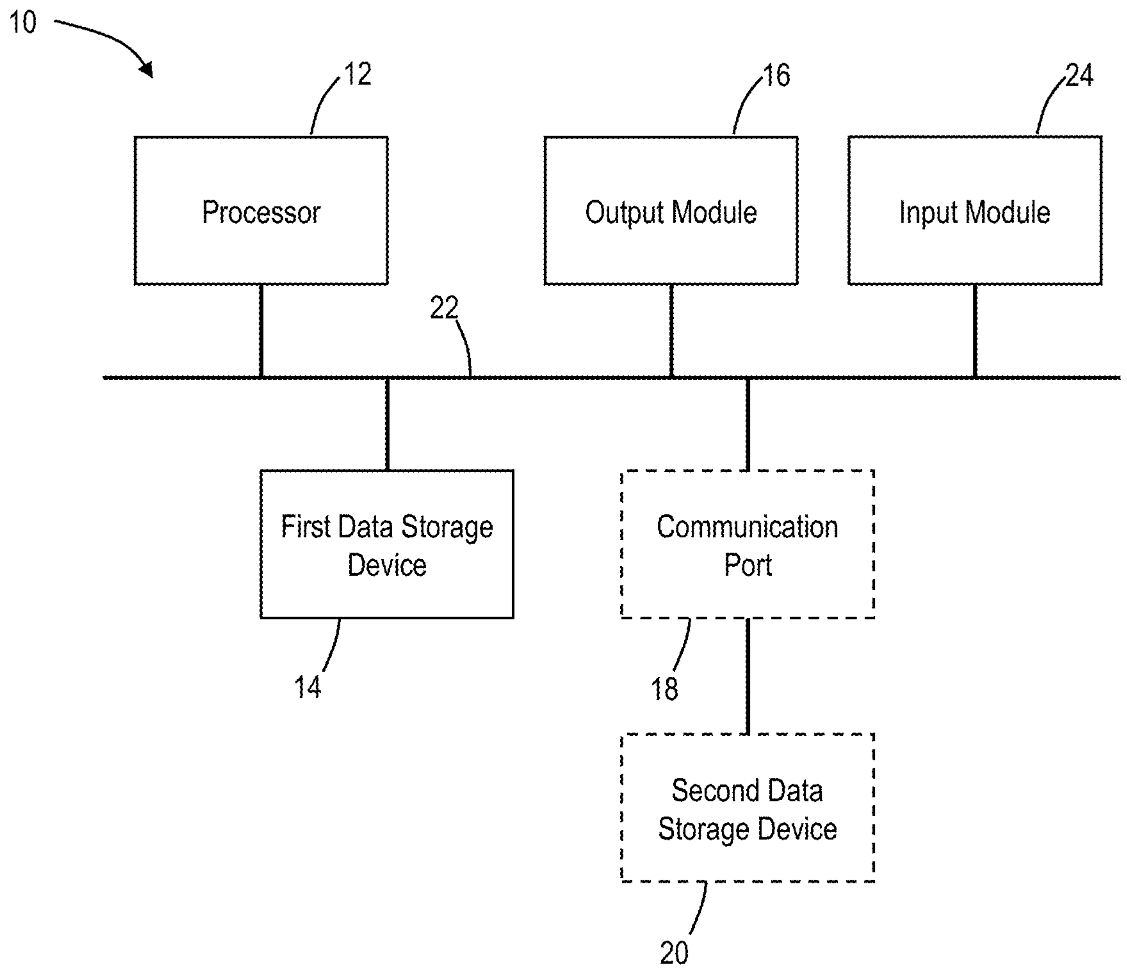
FIG. 1 is a block diagram of a computer system for generating and posting tailored digital communication and content, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods, and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to digital communication particularly a system and method for generating and posting tailored digital communication and content.

Referring now to FIG. 1, shown therein is a system 10 for generating and posting tailored digital communication and content, according to an embodiment.

The system 10 includes a processor 12, a first data storage device 14, an output module 16, a communication port 18, a second data storage device 20 coupled to the communication port 20 and an input module 24. In this embodiment, the various components 12, 14, 16, 18, and 24 of the system 10 are operatively coupled using a system bus 22.

The system 10 may be various electronic devices such as personal computers, networked computers, portable computers, portable electronic devices, personal digital assistants, laptops, desktops, mobile phones, smart phones, tablets, and so on.

In some examples, the first data storage device 14 may be a hard disk drive, a solid-state drive, or any other form of suitable data storage device and/or memory that may be used in various electronic devices. The data storage device 14 may have various data stored thereon. Generally, the data stored on the data storage device 14 includes data that may be of value when generating and evaluating communication approaches and generating tailored content. The data stored on the data storage device 14 may further include data of the system such as campaign data. The data stored on the data storage device 14 may further include the creative data.

In the embodiment as shown, another data storage device in addition to the first data storage device 14, namely the second data storage device 20, is provided. The second data storage device 20 may be used to store computer-executable instructions that can be executed by the processor 12 to configure the processor 12 to generate and post tailored digital content or a user interface based on data stored in the data storage device 14 or of a data acquired from the first data storage device 14 and stored in the second data storage device 20.

It should be noted that it is not necessary to provide a second data storage device, and in other embodiments, the instructions may be stored in the first data storage device 14 or any other data storage device.

In some cases, the first data storage device 14 may be a data storage device external to the system 10 or processor 12. For example, the first data storage device 14 may be a data storage component of an external computing device (e.g. a data server) that stores social media data for later processing and posting. In such cases, the processor 12 may be configured to execute computer-executable instructions (stored in second data storage device 20) to acquire social media data of the first data storage device 14 and store the social media in the second data storage device 20.

The processor 12 may be configured to provide a user interface to the output module 16. The output module 16, for example, may be a suitable display device, and/or output device coupled to the processor 12. The display device may include any type of device for presenting visual information. For example, the display device may be a computer monitor, a flat-screen display, a projector, or a display panel. The output device may include any type of device for presenting a hard copy of information, such as a printer for example. The output device may also include other types of output devices such as speakers, for example. The user interface allows the processor 12 to solicit input from a user regarding various types of operations to be performed by the processor 12. The user interface also allows for the display of various output data and selections, such as visual presentation of campaign data and selections, generated by the processor 12.

The input module 24 may include any device for entering information into system 10. For example, input module 24 may be a keyboard, keypad, cursor-control device, touchscreen, camera, or microphone. It will be appreciated that in certain embodiments the input module 24 and the output module 16 are the same device. As an example, the input module 24 and the output module 16 may be a single touchscreen, and/or a smart speaker.

The system 10 may be a purpose-built machine designed specifically for generating and posting tailored digital communication and content. In some cases, system 10 may include multiple of any one or more of processors, applications, software modules, second storage devices, network connections, input devices, output devices, and display devices.

The system 10 may be a server computer, desktop computer, notebook computer, tablet, PDA, smartphone, or another computing device. The system 10 may include a connection with a network such as a wired or wireless connection to the Internet. In some cases, the network may include other types of computer or telecommunication networks. The system 10 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor 12 may execute applications, computer readable instructions or programs. The applications, computer readable instructions or programs may be stored in memory or in secondary storage or may be received from the Internet or other network.

Although system 10 is described with various components, one skilled in the art will appreciate that the system 10 may in some cases contain fewer, additional, or different components. In addition, although aspects of an implementation of the system 10 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the system 10 and/or processor 12 to perform a particular method.

In the description that follows, devices such as system 10 are described performing certain acts. It will be appreciated that any one or more of these devices may perform an act automatically or in response to an interaction by a user of that device. That is, the user of the device may manipulate one or more input devices (e.g., a touchscreen, a mouse, or a button) causing the device to perform the described act. In many cases, this aspect may not be described below, but it will be understood.

As an example, a user using the system 10 may manipulate one or more input devices (not shown; e.g., a mouse and a keyboard) to interact with a user interface displayed on a display of the system 10. In some cases, the system 10 may generate and/or receive a user interface from the network (e.g. in the form of a webpage). Alternatively, or in addition, a user interface may be stored locally at a device (e.g. a cache of a webpage or a mobile application).

In response to receiving information, the system 10 may store the information in storage database. The storage may correspond with secondary storage of the system 10. Generally, the storage database may be any suitable storage device such as a hard disk drive, a solid state drive, a memory card, or a disk (e.g., CD, DVD, or Blu-ray etc.). Also, the storage database may be locally connected with the system 10. In some cases, storage database may be located remotely from system 10 and accessible to system 10 across a network for example. In some cases, storage database may comprise one or more storage devices located at a networked cloud storage provider.

Figure 2:
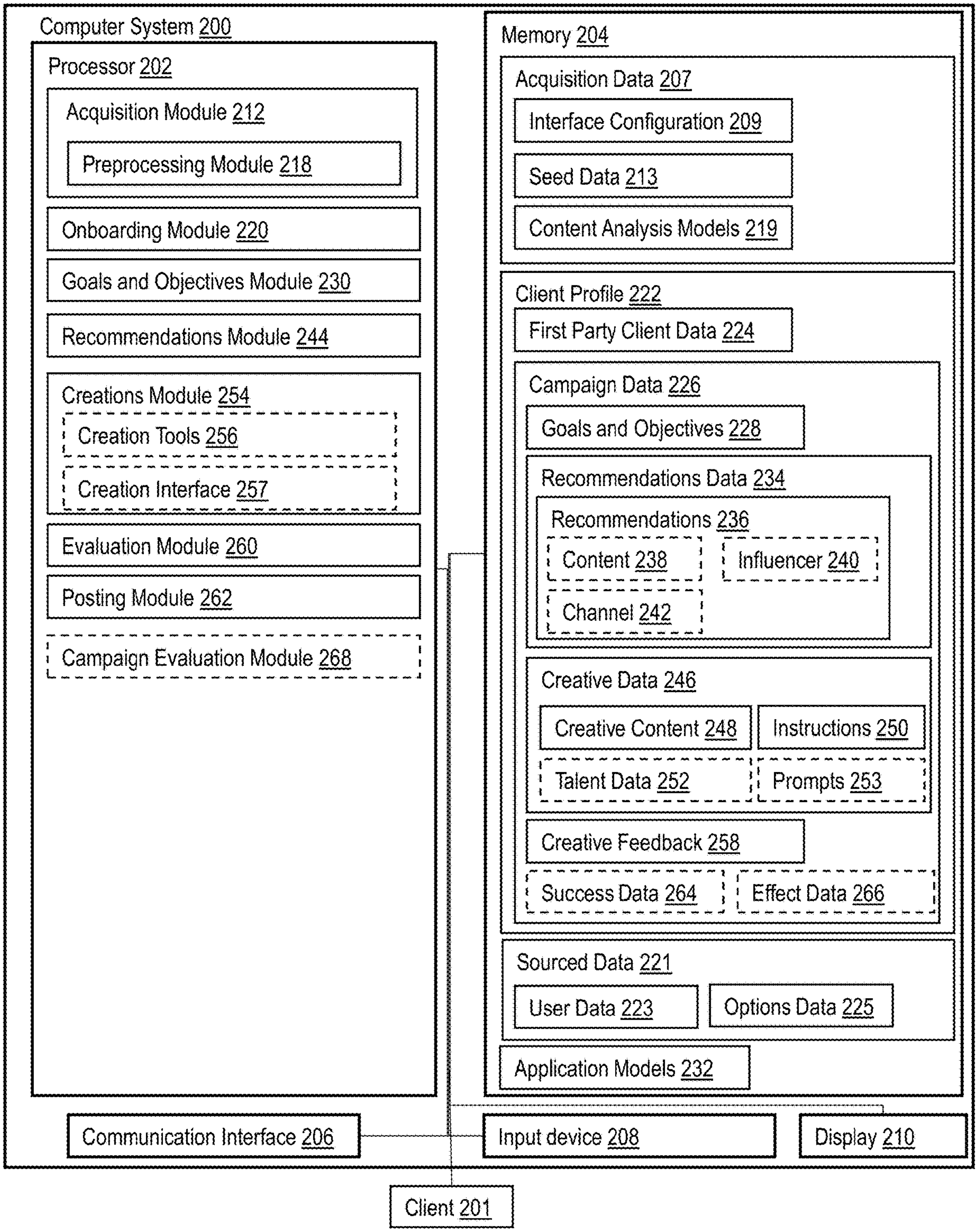
FIG. 2 is a further block diagram of the computer system of FIG. 1, according to an embodiment.

Referring now to FIG. 2, shown therein is a computer system 200 for generating and posting tailored digital communication and content. The tailored digital communication and content is stored in the creative data 246, further described below.

The computer system 200 is configured to generate and post the creative data 246 by applying input data to a series of application models 232 further described below. Generally, the input data applied to a receiving application model includes data generated via a generating application model. These inputs/outputs include prompts that are engineered to implement instructions of the input/output data. For example, a recommendations data 234 generated via a recommendations model (i.e. generating model) may include a recommendation 236 (i.e. instruction) to record a video including a shot list (i.e. a prompt) that when applied to a creative model (i.e. receiving model), generates a script for the video as further described below. The generating application model is dedicatedly trained for the corresponding receiving application model. Continuing the previous example, the recommendations model is dedicatedly trained to generate prompts for the corresponding creative model. The dedicated training establishes a pairing between the prompts provided by the generating application model and receiving application model 232. The pairing beneficially focuses the generating model to provide prompts that effectively elicit accurate and optimal responses from the corresponding receiving application models. Dedicatedly training the generating models beneficially reduces the resources (time, processing power, effort) to generate optimal prompts to obtain an application model generated creative data 246 that is ready for posting.

The computer system 200 may be the system 10 of FIG. 1. The computer system 200 may be configured to implement the method 400 of FIG. 4. Aspects of the computer system 200 may be implemented on a single computing device or across a plurality of computing devices.

The system 200 includes a processor 202. The processor 202 is configured to generate and post the creative data 246, further described below.

The system 200 includes memory 204. The memory 204 is communicatively connected to the processor 202. The memory 204 stores computer-executable instructions which, when executed by the processor 202, cause the computer system 200 to perform the functions and provide the functionalities described herein. The memory 204 also stores data such as application models 232, further described below, used by the processor 202 to perform the functions and provide the functionalities described herein. The memory 204 may also store data which is output when the executable instructions are executed by the processor 202, such as creative data 246, further described below. The memory 204 may store this data in various data structures. For example, the memory 204 may include various data structures configured to store the data 310 of FIG. 3B.

The system 200 further includes a communication interface 206. The communication interface 206 is configured to acquire and transmit data to and from the computer system 200. In an embodiment, the communication interface 206 may include a network interface for communicating with one or more networked computing devices.

The communication interface 206 is configured to acquire data according to various interface configurations 209. The interface configurations 209 are predetermined configurations such as various application programming interfaces (APIs) or user agents. The interface configurations are stored in an acquisition data 207 which is further stored in the memory 204.

Each interface configuration 209 is retrieved from the acquisition data 207 and applied to the configuration interface 206 based on the data being acquired via the communication interface 206. The interface configuration 209 applied may further be based on a source of the data. For example, the acquisition data 207 may include various interface configurations 209 each corresponding to the client 201, a system provider, or third party platforms such as Facebook® or Twitter®. The interface configuration 209 applied may further be based on the type of data being acquired. For example, the interface data 207 may include various interface configurations 209 corresponding to the acquisition of search, streaming and user data. Examples of the various interface configurations 209 are depicted at 312 of FIG. 3B.

In an embodiment, the communication interface 209 is configured to generate a human interface such as a graphical user interface (GUI), for example where the client 201 is a human being. The GUI is displayed on the display 210, further described below.

The communication interface 206 may receive the data via an upload by the source. The communication interface 206 may further acquire data by retrieving data via, for example, a link or file/directory path. In some embodiments, the communication interface 206 is configured to prompt a source of the data, such as a client 201, third party platforms, and the like. The prompt induces the source to upload the data or provide a link/path for the communication interface 206 to retrieve the data.

In some embodiments the data to be retrieved is secured. The communication interface 206 is configured to provide approved credentials, also referred to as VDATA, to access the data. It will be appreciated that the credentials may be imbedded in the link or path (i.e. a secure link). Where the credentials correspond to a client 201 or campaign, the credentials are saved in the client profile 222 or campaign data 226 respectively, each further described below.

The system 200 further includes an input device 208. The input device 208 is configured to receive an input, such as from a client 201 interacting with the system 200. The input may be received via a GUI of the communication interface 206 displayed on a display 210, further described below. The input may be data uploaded via the input device 208. The processor 202 may generate input data in response to the input received via the client input device 208 and store the input data in memory 204. The input data may then be used by the processor 202 to control operation of the system 200.

The system 200 further includes a display device 210. The display device 210 is configured to display an output generated by the processor 202. In an embodiment, the display device 210 may display a GUI configured to receive input such that a client 201 can interact with the system 200 and view outputs generated thereby.

The processor 202 includes an acquisition module 212. The acquisition module 212 is configured to acquire various data from various sources. The acquisition module 212 acquires the data via the communication interface 206. The acquisition module 212 may acquire the data according to an input received via the input device 208. The acquisition module 212 may further acquire the data according to a seed data 213. The seed data 213 may include seed words or report extraction seeds such as the example seeds 314 of FIG. 3B.

The acquisition module 212 may include a preprocessing module 218. The preprocessing module 218 is configured to preprocess data acquired by the acquisition module 212. The preprocessing includes converting the acquired data from an acquired data in an acquired format to a second data in a second format. The second data includes data relevant to the operations of the other modules of the system 200. The second format is a format expected by such modules.

The preprocessing of the preprocessing module 218 is according to various content analysis models 219. Each content analysis model 219 may include predetermined mappings such as the aspect-ontology mapping 303 of FIG. 3B. Each content analysis model 219 may further be an AI model.

The particular content analysis model 219 the acquired data is applied to may depend on type of data acquired. For example, where the data acquired includes audio (i.e. an audio file or video file with audio) the acquired data may be applied to a sound emotion analysis model. Examples of content analysis models 219 further include text preprocessing models such as the example text preprocessing models 308 of FIG. 3B. Examples of content analysis models 219 further include linguistic feature extraction models such as the example linguistic feature extraction models 306 of FIG. 3B. Examples of content analysis models 219 further include semantic analysis models such the example semantic analysis models 304. Examples content analysis models 219 further include image/video content moderation, image/video optical character recognition (OCR), video transcription, text sentiment emotion and keywords analyses, cyberbullying text detection, suicidal text detection, anxiety/depression text detection, hate speech text detection, sound emotion analysis, and video shot detection models.

Each content analysis model 219 is adaptive. Executing the content analysis model updates the content analysis model based on the inputs applied to the model. It will be appreciated, that an output of a content analysis model 219 may be different for successive executions of the model even given the same applied inputs.

The acquisition module 212 may save the acquired or preprocessed data in the memory 204. The acquisition module 212 may further provide such data to various other modules of the processor 202.

The memory 204 is further configured to store sourced data 221. The sourced data 221 includes data not of the client 201. The sourced data 221 may include third party data (i.e. social media data), private data, public data and the like.

The sourced data 221 includes user data 223. The user data 223 is data about users such as social media analytics and raw data from opt-in social channels or paid social media platform services. The sourced data 221 may further include options data 225. Options data 225 includes data that indicates various options for communication and may include corresponding implementation data. For example, the options data 225 may include interface data of a channel such as an API or GUI data. In a further example, the options data 225 includes a talent database comprising data on potential talent as influencers and corresponding tools data such standard engagement contracts. The sourced data 221 may be acquired and preprocessed via the acquisition module 212.

It is expressly contemplated that, in addition to third party sources, sourced data 221 may be obtained from the client 201 or a service provider of the system. For example, the client 201 or service provider may have gathered data such as third party data in a database. Such data may be acquired by the acquired from the client 201 and saved in the sourced data 221. It will be appreciated that data such third party acquired provided by the client 201 may not be of the client 201 (i.e. public third party data). This data is therefore saved in the sourced data 221 rather than or in addition to being stored in the first party client data 224, further described below.

The particular sourced data 221 acquired may be according to a predetermined aspect of the system 200 or memory 204. For example, the predetermined aspect may be a module configuration, model, application programming interface (API) or the like. The predetermined aspect may correspond to the module for which the data of the sourced data 221 is acquired.

It will be appreciated that acquiring the sourced data 221 according to a predetermined aspect of the system, instead of or in addition to aspects or selections of the client 201, beneficially includes relevant data in the sourced data 221 that the client 201 may not be aware of.

Acquiring the sourced data 221 by the system further beneficially provides a separation between the client 201 and the source of the sourced data 221 and may provide an acquisition that is standardized and reliably repeatable. This separation, standardization, and repeatability may beneficially mitigate data privacy concerns and thereby encourage the source to authorize the system 200 to access and use the of data. The authorization beneficially provides the client 201 with purpose driven access to additional sourced data 221 for tailoring the communication of the campaign.

In some embodiments, the sourced data 221 is acquired independently of a client 201 or campaign. For example, a processing model 219, such as a sourced data model of the system 200 may trigger the acquisition module 212 to periodically acquire all accessible posts on a specific platform including keywords indicated by the seed data 213.

In some embodiments, the acquisition module 212 acquires the sourced data 221 according to a trigger from another module. For example, where sourced data 221 is relevant to a specific client 201 or campaign, the onboarding module 220 or goals and objectives Module 230, respectively and further described below, may trigger the acquisition module 212. The trigger may indicate a model and corresponding applicable inputs for acquiring the sourced data 221.

The processor 202 further includes an onboarding module 220. The onboarding module 220 is configured to onboard the client 201.

The memory 204 is further configured to store client profiles 222. Each client profile 222 is generated by the onboarding module 220 in response to an onboarding request from the client 201. Generating the client profile 222 may be referred to as registering the client 201.

The client profile 222 is configured to store first party client data 224. The onboarding module 220 is configured to gather the first party client data 224, as further described at 402 of FIG. 4 below. Gathering the first party client data 224 from the client 201 includes gathering data from the client, generating the first party client data 224 from the gathered data, and saving the first party client data 224 in the client profile 222. The first party client data 224 may be acquired and preprocessed via the acquisition module 212. It will be appreciated that the first party client data 224 typically includes proprietary data of the client 201. Saving the first party client data 224 in the client profile 224 beneficially associates the first party client data 224 with the corresponding client 201 to separate each first party client data 224 and facilitate handling according to protocols for handling proprietary client data.

The first party client data 224 includes data about the client 201. For example the first party client data 224 includes identifying data and may include further contextual data and analytics of the client 201. The client profile 222 may further include data collected or generated by the client 201 such as data on third parties, marketing metrics, or operations data such as sales metrics.

The client profile 222 is configured to store one or more campaign datas 226. Each campaign data 226 is configured to store data relevant to a specific campaign. It will be appreciated that where a campaign is described herein, the description may similarly apply to any endeavor that includes digital communication such as deals, sales, outreach/awareness, event planning, emergency notification, etc.

The campaign data 226 is configured to store a goals and objectives data 228. The goals and objectives data 228 includes data indicating goals and objectives of the campaign such as the purpose, intended audience, requirements, desired outcome, and metrics of the campaign.

The processor 202 further includes a goals and objectives module 230. The goals and objectives module 230 is configured to obtain the goals and objectives and save the goals and objectives in the goals and objectives data 228.

In some embodiments, the goals and objectives data 228 is obtained by the system 200 directly as an input such as from the client 201. For example, the client 201 may provide a budget for the campaign. In this embodiment, the goals and objectives may be obtained via the acquisition module 212.

Figure 4:
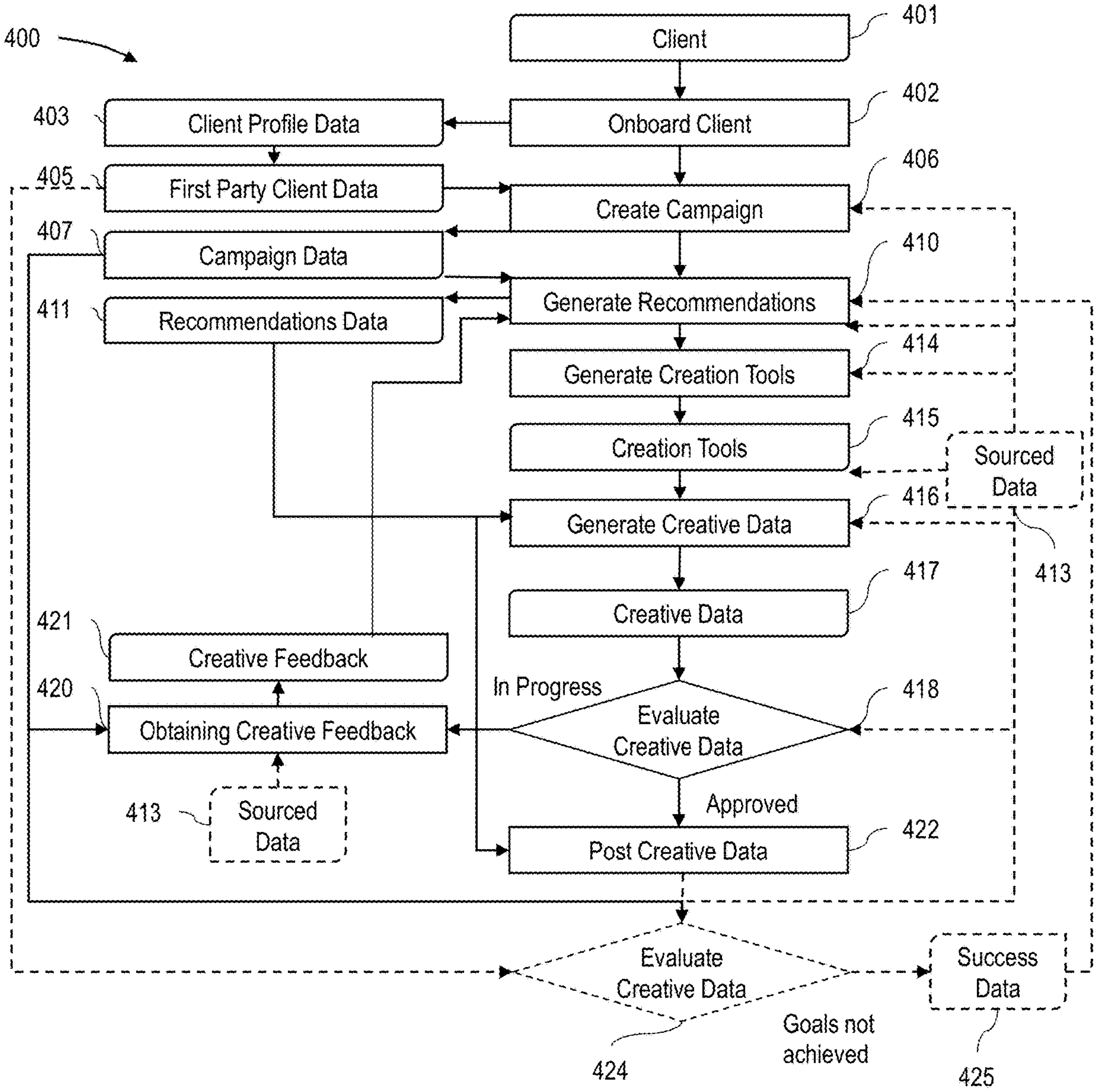
FIG. 4 is a flow diagram of a method for generating and posting tailored digital communication and content, according to an embodiment.

In some embodiments, the goals and objectives 228 are generated automatically such as described in the method 400, at 406, of FIG. 4. In these embodiments, the goals and objectives module 203 may obtain the sourced data 221 or a portion thereof and apply it to an application model 232, further described below, of the goals and objectives module 203.

The memory 204 is further configured to store one or more application model 232. Each application model 232 provides an output data based on various applied inputs. Each application model 232 may be an artificial intelligence (AI) model and/or a predetermined mapping. Application models 232 may be purpose built generally for the system 200, for specific instances of the system 200, or generally for specific modules or specific instances of specific modules of the system 200. The application models 232 may be provided by a service provider of the system 200.

Each application model 232 is trainable. Training an application model 332 includes updating, at least in part, data of the application model 232. It will be appreciated therefore that a particular application model 232 may provide different outputs for multiple executions of the application model 232 even given the same applied inputs, such as the client inputs.

Training an application model 232 may include updating of all or part of the model data if a threshold is reached. The threshold may be related to a composition or character of outputs and/or inputs of the application model 232. For example, an application model 232 may be updated if a quantity of executions (i.e. client inputs and model output pairs) is reached. The threshold may also be based on factors or context external to the application model 232 such as time and/or a measure of change in contextual data. In an example, the application model 232 is updated monthly and if a search term that was previously ranked as "most searched" drops below a top 10 ranking.

In some embodiments, the updates are based on the input and/or output of previous executions of the to be updated application model 232. Updates of this nature may include updating the model based on the output generated corresponding to a client input (i.e. input/output pairs).

Figure 3A:
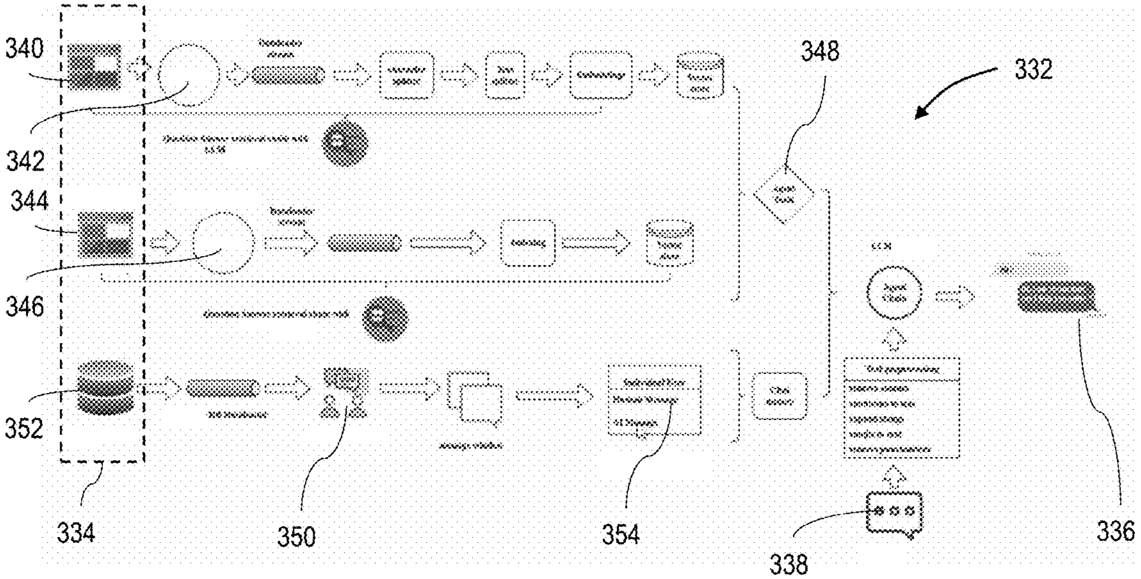
FIG. 3A is a block diagram of the application model FIG. 2, according to an embodiment.

Referring to FIG. 3A, shown therein is a block diagram of application model 332, according to an embodiment. The application model 332 may be an embodiment of the application model 232 of FIG. 2.

In some embodiments, the application model 332, or a part thereof, is trained according to the threshold reached. In an example, a core data 340 of the application model 332 is updated monthly (i.e. the core data 340 update is triggered when a time threshold being reached). The core data 340 corresponds to a large language model (LLM) 342 of the application model. An adaptive data 344 of the application model 332 is updated after a small number of executions of the application model 332 (i.e. the adaptive data 344 update is triggered when a quantity threshold is reached). The adaptive data corresponds to an adaptive model 336 of the application model 332. The application model 332, via agent tools 348, preferences the core data 340 over the adaptive data 344. Therefore, for this example, the application model 332 is preferentially responsive to monthly updates of the core data 340 while only adapting to changes based on quantity of executions for instances beyond the scope of the core data 340.

Updating a subset of model data based on the threshold therefore beneficially provides an application model 332 that is preferentially responsive to various contexts, such as what has been consistent a given time periods. It is expressly contemplated that the threshold types and triggers may vary to accommodate desired contexts such as audiences or channels. This threshold based updating minimizes the processing of irrelevant data and mitigates the effects of noise in core data 344 areas. This improves output quality and reduces processing power.

The application model 332 is further trained based on contextual data 334, also known as contextual memory 334 or contextual intelligence 334. Contextual data 334 provides context to the application model 332 in which user input 338 can be applied. Contextual data 334 may include data such as the core data 340, the adaptive data 344, the sourced data 221 of FIG. 2 and/or first party client data 224 of FIG. 2.

In an example, offending audiences may be determined to correlate to a drop in sales. Therefore, an application model 232 may be configured to avoid generating and/or providing responses 336 such as recommendations 236, creative content 248, and/or instructions 250 of FIG. 2 that may offend target audiences. Determining these avoided responses may be based on recent current events. In this example, the application model 332 is trained based contextual data 334 that indicates such recent current events to improve responsive to the current events. In a specific example, the contextual data 334 may include weather data that indicates a current surge in devastating forest fires. The application model 332 trained on such contextual data 334 may avoid responses 336 that, even metaphorically, evoke fire imagery.

In some embodiments, the application model 332 is updated for and applied to specific contexts. For example, an application model 332 may be trained for a specific client (i.e. personalized) and/or intended audience. An application model 332 may also be trained for a specific client conversation 350. The conversation 350 may be a chat comprising messages between the client and the application model 332. Where the application model 332 is trained for a client conversation 350, the contextual memory 334 may be based, for example, on stored prompts 352 of executions of the application model 332, a collection 354 of previous user inputs messages and messages generated by the application model 332 of the conversation, or combinations thereof. Contextually updating and applying the application model 332 beneficially provides tailored application models 332 which can serve as deep fakes or masks optimized for application in corresponding contexts.

Updating the application model 332 based on contextual data 334 enhances the contextual aspects of the data. Contextually updated application models 332 also provide responses that are more responsive to the intent of the client input 338 over non-contextual application models such as application models directed to the semantics of the user input without context. This tailoring increases the likelihood of creative data 246, further described below, that achieves the goals and objectives 228 and improves the efficiency (reduces the iterations) to arrive at this creative data 246. This conserves resources and processing power of the system and improves the likelihood of use of the system.

Referring back to FIG. 2, each application model 232 may correspond to one or more specific modules of the system. It will be appreciated that where an application model 232 is referred to in the context of a module, that model may be an instance of the application model 232 referred to, specific to the module.

Figure 3B:
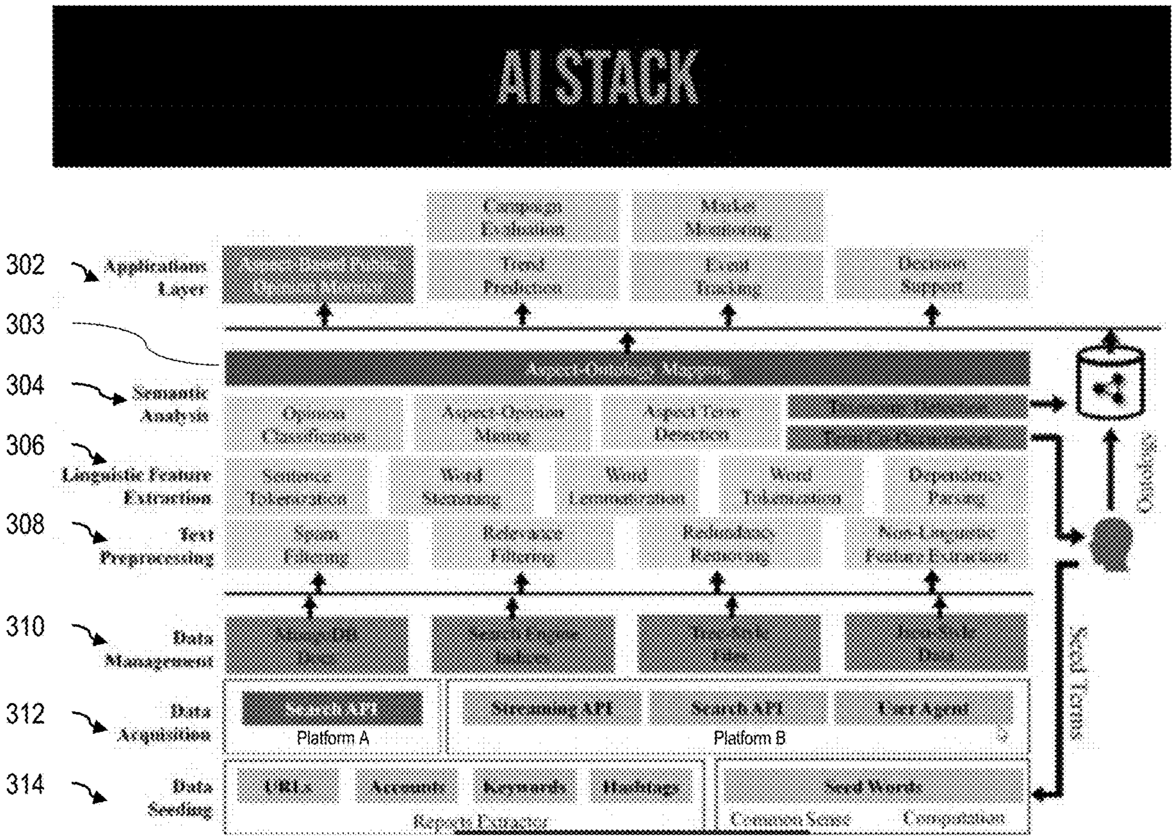
FIG. 3B is a block diagram of an AI stack depicting various examples of the models and interfaces of FIG. 2, according to an embodiment.

The application models 232 may include the example application models 302 of FIG. 3B. The application models 232 may further include text to image, text to video, text to screenplay, text to articles, and caption generation from image video and text models.

The campaign data 226 is configured to store a recommendations data 234. The recommendations data 234 is configured to store recommendations 236. Each recommendation 236 indicates selected options suggested or recommended for communication of the campaign.

The recommendation data 234 may indicate a ranking or preference between various recommendations 236 of the recommendation data 238. The ranking beneficially facilitates the prioritizing of implementing recommendations 236 according to available resources.

The recommendations 236 may include content 238, influencer 240 and channel 242 recommendations 236.

Content recommendations 238 include data relevant to the content of potential communications. For example, a content recommendation 238 may include a concept for a video.

Influencer recommendations 240 include data relevant to the talent of the proposed communication. The talent may include any entity (i.e. person or organization) associated with the communication, such as an author, a person in or alluded to in the content, the poster etc. For example, the influencer recommendation 240 may indicate a specific influencer or influencers to post a video.

Channel recommendations 236 include data indicating channels by which the communication is disseminated. For example, a channel recommendation 242 may indicate that the video be posted on a specific channel of a video streaming service.

It is expressly contemplated that each recommendation 236 may be of multiple recommendation types. For example, a particular recommendation 236 may include a recommendation to post a video according to a recommended concept (content 238) produced by a recommended influencer (influencer 240) on a recommended channel (channel 242).

Each recommendation 236 may further include guidance or instructions on how to implement the recommendation. For example, a content recommendation 238 may include a shot list (i.e. outline) for a video.

Each recommendation 236 may further include tools to implement the recommendation. The tools may include prompts or prompt responses which are engineered to implement the recommendation 236, for example when the prompts or prompt responses are applied to an application model 232. The prompts are engineered via application models 232 corresponding to the recommendation module that are dedicatedly trained specifically for other corresponding application models 232 executed by the creations module 254, further described below. The dedicated training establishes a pairing between the prompts provided of the recommendations data 234 and the corresponding application model 232. The pairing beneficially provides prompts that effectively elicit accurate and optimal responses from the corresponding application models 232. Dedicatedly training the prompt engineering models beneficially reduces the resources (time, processing power, effort) to generate optimal prompts to obtain a model generated creative data 246 that is ready for posting.

The processor 202 further includes a recommendations module 244. The recommendations module 244 is configured to generate the recommendations 236 and save the recommendations in the recommendations data 234. The recommendations module 244 is further configured to apply the goals and objectives 228 and the options data 225 to an application model 232 corresponding to the recommendations module 244 to obtain the recommendations 236.

In some embodiments, the recommendations module 244 is further configured to apply first party client data 224 and/or the sourced data 221 to the application model 232 to obtain the recommendations 236. This data may indicate for example current trends that that may inform the output of the recommendations module 244.

The recommendations module 244 is further configured to receive creative feedback 258, further described below, and apply the creative feedback 258 to the application model 232 to obtain the recommendations 236. It will be appreciated that the creative feedback 258 may be applied in addition to or as replacement for the goals and objectives 228.

The campaign data 204 is further configured to store a creative data 246. The creative data 246 is configured to store tailored communication and content data. This data includes data for implementing the recommendations 236.

The data pf the creative data 246 may include creative content 248. The creative content 248 may or may not be ready to post. In an example, the creative content 248 includes a fully composed posting with, for example, text, hashtags, and a photograph to be posted. In a further example, the creative content 248 includes a script for a video to be recorded by an influencer prior to posting.

The creative data 246 is further configured to store instructions 250. The instructions 250 include instructions on how to implement the recommendations, such as posting configurations, what creative content 248 to post on what channel, where to focus, what to add, remove or edit, etc. The instructions may be human and/or machine readable such that when executed by a human or processor the instructions are implemented.

The instructions 250 may be time dependent. For example, the instructions may include instructions to boost (i.e. pay for ads) a campaign in the middle of a duration of the campaign. Boosting the campaign may serve to gauge the audience of the campaign which beneficially provides effect data 266, further described below.

The creative data 246 is further configured to store talent data 252. The talent data 252 includes data relevant to the talent such as influencer details (i.e. contact information, authenticity statistics, etc.) or tools such as standard engagement policies and contracts of a particular influencer.

The creative data 246 is further configured to store prompts 253. The prompts 253 indicate information identified by the creations module 254, further described below, that, if applied to the corresponding applications module 232 would refine the creative data 246. For example, a prompt 253 may be "Is the video for mature audiences?". It will be appreciated that the existence of prompts 253 stored in the creative data 246 is not exclusive of other data in the creative data nor is it indicative of the sufficiency or readiness of other data stored in the creative data 246.

The processor 202 further includes a creations module 254. The creations module 254 is configured to generate the creative data 246 and save the creative data 246 in the campaign data 226. The creations module 254 is configured to apply recommendations to an application model 232 corresponding to the creations module 254 to obtain the creative data 246. The creations module 254 may further be configured to apply first party client data 224, sourced data 221, or creative feedback data 258, further described below, to obtain the creative data 246.

It will be appreciated the recommendations applied to the creations module 254 are based on but may be different from the recommendations 236. The differences may be according to the performance of at 416 of FIG. 4, described below. It will further be appreciated that the application model 232 corresponding to the creations module 254 may be a third-party model.

The creations module 254 may be further configured to generate creation tools 256. The creation tools 256 provide a creation interface 257. The creation interface 257 is configured to facilitate the application of the recommendations 236 to a corresponding application model. The application model may be an application model 232 of the system 200 or the application model may be a third party model of a third party module, as described below. The creation interface 257 may include a GUI or backend interface for receiving input, such as from the client 201.

Figure 5:
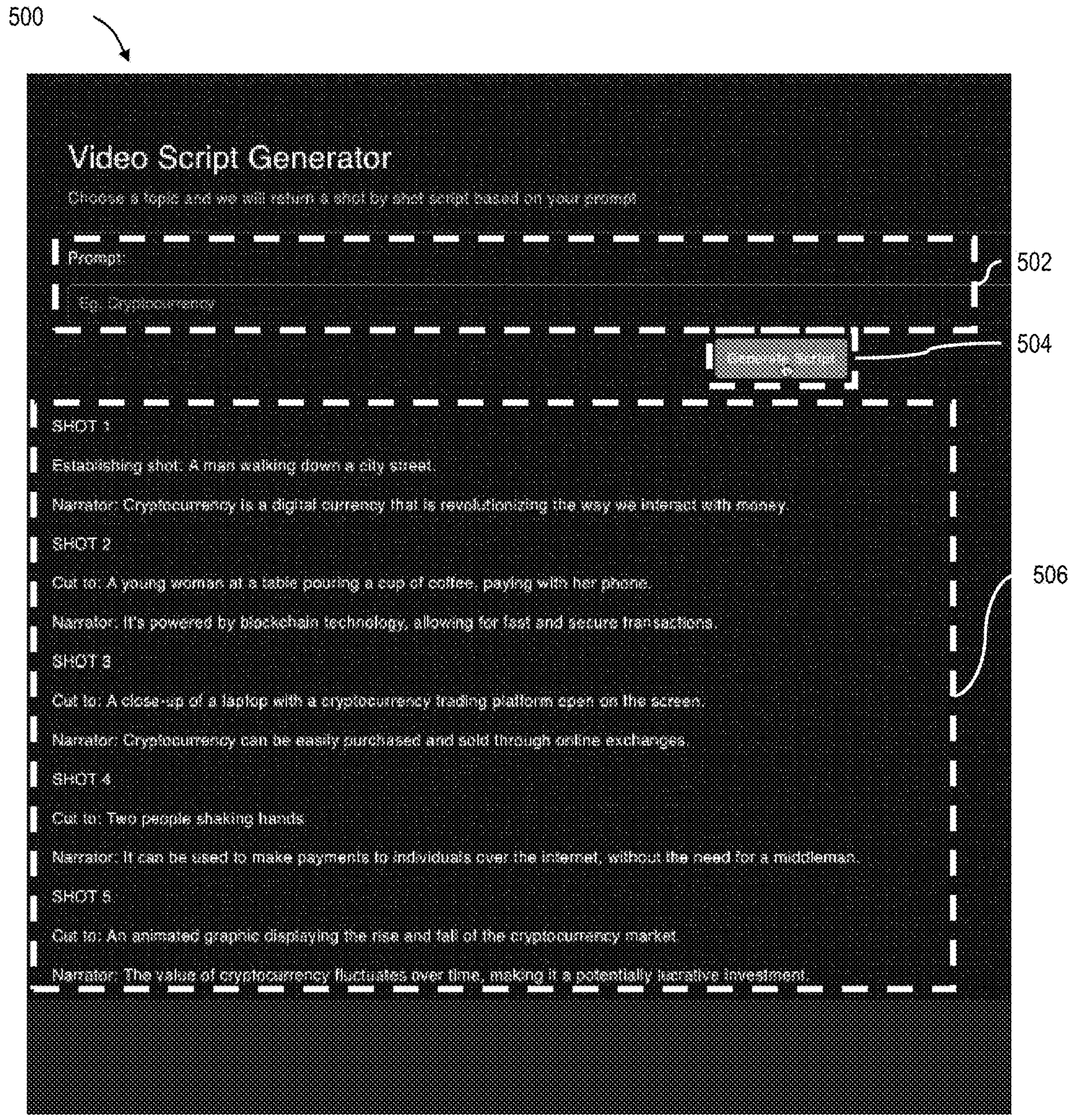
FIG. 5 is a screen shot of creation GUI of the creation interface of FIG. 2 displayed on the display of FIG. 2, according to an embodiment.

Referring to FIGS. 2 and 5, shown in FIG. 5 is screen shot of creation GUI 500 of a creation interface 257 displayed on a display, according to an embodiment. The creation GUI 500 includes a prompt field 502 for receiving prompts. The prompts provided to the prompt field 502 may be or be based on prompts of the recommendations 236. The GUI 500 further includes a button 504 for submitting the prompts. The creation GUI 500 further includes a display panel 506 for displaying a representation of the creative data 246 generated via the prompt submission.

In an embodiment, the creation GUI 500 frames a third party creation module or modules such as such as ChatGPT™. In this embodiment, the GUI 500 is configured to submit the received prompts to the third party module (i.e. call the third party modules) and receive and display a representation of the returned creative data 246. To frame the third-party creation modules, the GUI 500 may be configured based on an API of such third-party modules and a theme or configuration of the creation tool 256.

This configuration incorporating elements of both the GUI 500 and the creation tool 256 beneficially provides the client 201 with a GUI 500 that is familiar and consistent with the system 200 while providing the functionality of the third-party modules or models. This beneficially reduces the training necessary (i.e. one system to learn for creating a campaign) which beneficially reduces the resources required and the potential for error. Furthermore, as the GUI 500 may frame and call multiple third party creation modules of various third parties, the GUI 500 provides an interface that beneficially aggregates the functionality of these various third parties.

Referring again specifically to FIG. 2, the processor 202 further includes an evaluation module 258. The evaluation module 258 is configured to determine a status of the creative data 246.

In some embodiments, the evaluation module 258 is configured to determine the status of the creative data 246 based on one or more qualities of the creative data 246. The qualities may include, for example, a projected probability of campaign success or a security rating.

In an example, the evaluation is based on a projected probability that posting according to the creative data 246 will achieve the goals and objectives 228. The projected probability may be determined when the creative data is applied to an application model 232 corresponding to campaign evaluation. The projected achievement may be evaluated by the application model 232 according to the metrics of the goals and objectives data 224.

In further example, the evaluation is based on if the creative data 246 aligns with an image of the client (i.e. is on brand). The evaluation may be according to, for example, a secure model configured to evaluate elements of the creative data 246 against parameters defined in the first party client data 224. These parameters may include, for example, thresholds and flags for violent, illicit, and explicit materials.

In some embodiments, the evaluation module 258 is configured to determine that the status of the creative data 246 is in progress based on the existence of specific data stored in the creative data 246 such as prompts 253. In some embodiments, the evaluation module 258 is configured to generate and display a representation of the creative data 246 and receive an input indicating the status of the creative data 246. In some embodiments, the evaluation module 258 is configured to determine the status of the creative data 246 by applying the creative data 246 and for example, the goals and objectives 228 or first party client data 224 to an application model 232 corresponding to the evaluation module 258. It is expressly contemplated that some embodiments include a combination of these evaluation module 258 configurations.

The campaign data 226 is further configured to store creative feedback 258. The creative feedback 258 includes data which, when applied by the recommendations module 244, updates the recommendations 236. The creative feedback 258 may include prompts 253 which cause the recommendations module 244 to generate a response. The creative feedback 258 may further include a response, such as from the client 201, to the prompts 253. For example, where the creative data 246 includes a prompt 253 "Is the video to be directed towards mature audiences?" the creative feedback 258 may include the prompt 253 itself, the prompt and a response "no", or a response "The video is to be directed to a general audience including young children."

The creative feedback 258 may further include data based on the results of the status evaluation. For example, where the status evaluation determines the creative content 246 to not satisfy security parameters due to the depiction of alcohol, the creative feedback 258 may include data indicating that the creative content 248 should not contain alcohol related content.

Where the creative data is determined to be in progress, the evaluation module 258 is further configured to generate the creative feedback 258 and provide the creative feedback 258 to the recommendations module 244 or the goals and objectives module 230. The evaluation module 258 is configured to generate the creative feedback 258 similarly to and/or in conjunction with determining the status of the creative data 246.

The processor 202 further includes a posting module 262. The posting module 262 is configured to post the creative content 248 according to the instructions 250. The posting of posting module 262 may further be according to and executed utilizing the talent data 252. For example, the posting module 262 may record and post a video of the creative content 248 starring an influencer engaged via a contract of the talent data 252 to a channel indicated in the instructions 250.

The campaign data 226 is further configured to store a success data 264. The success data 264 includes data indicating a success of the postings of the campaign.

The campaign data 226 is further configured to store an effect data 266. The effect data includes data indicating the effect the campaign has produced. In some embodiments, the data stored in the effect data 266 is acquired by the acquisition module 212 explicitly for the effect data 266. In some embodiments, the data stored in the effect data 266 is acquired from data of system, such as the first party client data 224 or user data 223.

The processor 202 further includes a campaign evaluation module 268. The campaign evaluation module 268 is configured to evaluate the success of the campaign, generate corresponding success data 264 and provide the success data 264 to the goals and objectives module 220. The campaign evaluation module 268 is further configured to obtain the success data 264 by acquiring the effect data 266 and comparing the effect data 266 against the metrics of the goals and objectives 228.

Referring to FIG. 3B, shown therein is a block diagram of an AI stack 300 for generating and posting tailored digital communication and content, according to an embodiment.

The AI Stack 300 depicts example application models 302. The example application models 302 include aspect-based public opinion, trend prediction, market monitoring, event tracking, decision support, and campaign evaluation models.

The AI Stack 300 further depicts an aspect-ontology mapping 303.

The AI Stack 300 further depicts semantic analysis models 304. The semantic analysis models 304 include opinion classification, aspect-opinion mining, aspect term detection, taxonomy detection, and term co-occurrence models.

The AI Stack 300 further depicts example linguistic feature extraction models 306. The example linguistic feature extraction models 306 include sentence tokenization, word stemming, word lemmatization, word tokenization, and dependency parsing models.

The AI Stack 300 further depicts example text preprocessing models 308. The example text preprocessing models 308 include spam filtering, relevance filtering, redundancy removing, and non-linguistic feature extraction models.

The AI Stack 300 further depicts various example data management structures 310. The example data management structures include data structures configured to store Mongo database documents, search engine indices, tree-style files and JavaScript object notation (Json)-style data.

The AI Stack 300 further depicts various example data acquisition interface configurations 312. The example data acquisition interfaces 312 include search API, streaming APIs, and User Agents corresponding to various media platforms.

The AI Stack 300 further depicts various example seed terms 314. The example seed terms 314 include seed words such as computation or common sense seed words. The example seed terms 314 further include report extraction seeds such as uniform resource locators (URLs), accounts, keywords, and hashtags.

Referring to FIG. 4, shown therein is a flow diagram of a method 400 of generating and posting tailored digital communication and content, according to an embodiment.

The method 400, or portions thereof, may be implemented by the computer systems described herein, such as system 10 of FIG. 1. In particular, the method a may be encoded as computer-executable instructions in the memory 204 of FIG. 2, and executed by the processor 202 of FIG. 2, described above.

At 402, the method 400 includes onboarding, by the system, a client 401. The client 401 may be the client 201 of FIG. 2. Onboarding the client 401 may be referred to as registering a client 401.

Onboarding the client 401 includes initiating a client profile data 403, such as the client profile 222 of FIG. 2. Onboarding the client 401 may further include generating a graphical user interface (GUI) for displaying the data of the client profile data 403 via a display of the system.

Onboarding the client 401 may further include gathering first party client data 405 such as the first party client data 224 of FIG. 2. Gathering the first party client data 405 includes acquiring the first party client data 405 such as via upload from the client 401 or via a link or path provided by the client 401. Gathering the first party client data 405 further includes saving the first party client data 405 in the client profile data 403.

The first party client data 405 may be updated from time to time. Updating the first party client data 405 updates the first party client data 405 from a first version to a second version. The second version may be, for example, a more current or accurate version of the first party client data 405. This update may occur automatically, for example at a predetermined interval. This update may also be triggered by an action. For example, the update may be triggered by the client 401 accessing the client profile data 403. It is expressly contemplated that updating the first party client data 405 may require the system to receive an input from the client 401, such as access credentials or an updated link. In these cases, the client 401 may be prompted for such an input.

At 406, the method 400 further includes, creating a campaign data 407. The campaign data 407 may be the campaign data 226 of FIG. 2. Creating the campaign data 407 includes saving the campaign data 407 in the client profile data 403.

Creating a campaign data 407 further includes obtaining goal and objectives of the campaign. In some embodiments, the goals and objectives are obtained directly from the client 401. These goals and objectives may be obtained via the acquisition module 212 of FIG. 2.

In some embodiments, the goals and objectives are generated automatically. Where the goals and objectives are generated automatically, a goals and objectives module, such as the goals and objectives module 230 of FIG. 2, is executed.

Automatically generating the goals and objectives may include acquiring and applying, by the goals and objectives module, inputs such initial goals and objectives provided by the client 401 and client profile data 403 including first party client data 405.

Automatically generating the goals and objectives may further include acquiring and applying, by the goals and objectives module, sourced data 413. The sourced data 413 may be the sourced data 221 of FIG. 2.

In some embodiments, acquiring the sourced data 413 includes acquiring sourced data 413 based on initial inputs to the goals and objectives module such as first party client data 405 or initial goals and objectives.

In some embodiments, the sourced data 413 is acquired by the system prior to the initiation of generating the goals and objectives. In these embodiments, portions of the source data 413 corresponding to the campaign may be selected, for example by the goals and objectives module, for generating the goals and objectives. The selections may be according to a model or interface of the goals and objectives module and/or according to client 401 input. To maintain currency or improve accuracy of the sourced data 413, the sourced data 413 may be updated similarly to the first party client data 224.

In some embodiments, the data acquired from the source is preprocessed (e.g. by the preprocessing module 218 of FIG. 2). The preprocessing may be performed on the data prior to being received by the goals and objectives module. In a further embodiment, the preprocessing module may be engaged, by the goals and objectives module, to preprocess the received data prior to the processing of the goals and objectives module.

In an example where the goals and objectives are generated automatically, the goals and objectives module generates the goals and objectives based on initial goals and objectives provided by the client 401 and private data of the service provider stored in the sourced data 413. In a particular instance of this example, the client 401 provides the initial goal and objective of promoting her new cookbook. As a busy entrepreneur who finds time to cook, she intends to reach out to busy entrepreneur cooks like herself. Therefore, in providing her initial goals and objectives, she selects niches such as lifestyle, cooking, family and parenting, and busy professionals. However, the private data of the service provider indicates that the sale of cookbooks is driven more by adventurous eaters than the busy people making the food. Based on the models of the goals and objectives module, the goals and objectives module generates a goal and objectives data indicating a goal to reach this niche or consumer population.

At 410, the method 400, further includes generating a recommendations and saving the generated recommendation in the campaign data 407 and specifically a recommendations data 411 of the campaign data 407. The recommendations and recommendations data 411 may be the recommendations 236 and recommendations data 234, respectively, of FIG. 2. The recommendations data 411 may be generated, for example, by the recommendations module 244 of FIG. 2.

The recommendations data 411 is generated based on the goals and objectives. To generate the recommendations data 411, the goals and objective are applied to a recommendations model.

Generating the recommendations data 411 may be further based on creative feedback 421, further described below. In an example, a first script is provided to the recommendations module as a creative feedback 421. Upon receiving the creative feedback 421, the recommendations module updates the recommendations data 411 by applying at least the goals and objectives and creative feedback 421 (i.e. the script) to the recommendations model.

Basing the recommendations data 411 on creative feedback 421 beneficially provides an iterative process for refining the recommendations. Receiving the creative feedback 421, for example from the creative feedback module, causes the system to execute the generation of recommendations, at 410, and of creative data, at 416. Executing these steps causes an update of the recommendations data 411 and creative data 417, respectively.

The creative feedback 421 may further be used to train the recommendations models such that the models are beneficially updated. This dedicated update loop provides a pairing between the recommendations data 411 generation at 410 and the creative data 416 generation at 416.

Generating the recommendations data 411 may further include acquiring sourced data 413 and applying the sourced data 413 to the recommendations model.

Generating the recommendations data 411 may further include recommending influencers. The recommending of the influencers may be based on information of a talent database. The talent database stores information corresponding to each influencer (i.e. an influencer persona) such as demographic data, psychological data, and the like.

Generating the recommendations data 411 may further include recommending distribution channels, such the channels of various media, email, direct messaging platforms. It will be appreciated that a channel may refer to a single individual or multiple individuals indicated by a personal identifier such as an email or phone number (i.e. a mailing or phone list).

Generating the recommendations data 411 may further include recommending content. Recommending content may include recommending a concept for the content. For example a recommendation may include recommending a recording and posting a video on baking. Recommending content may further include generating and saving in the recommendations data 411 prompts engineered to implement the recommendations when applied to a creative model.

Generating the recommendations data 411 may include acquiring options data of the sourced data 413. The options data indicates potential recommendations and data corresponding to each recommendation. For example, the recommendations module may acquire options data that includes a talent database comprising data on potential talent as influencers and corresponding standard engagement contracts to generate a recommendations data 411 including an influencer recommendation.

Returning to the cookbook example above, the client 401 initially planned to post a video of her cooking a recipe from the book that is both quick and delicious on a channel aimed at busy people who cook. For the video she intended to showcase a recipe that has a small preparation time to cater to the time constraints of her busy audience. Based on the automatically generated goal of reaching food consumers, the system generates a recommendation for the video to be of an attractive celebrity chef (influencer recommendation) preparing an eye catching recipe (content recommendation) and to be distributed on a channel geared towards those who search for "what to eat tonight" (channel recommendation). The recommendation further includes a shot list for the video indicating the different shots (i.e. Shot 1: ingredients and equipment, Shot 2: Preparation, Shot 3: Reveal). The recommendation further includes the prompts and responses to provide to a creation tool as described below. The prompts are engineered to, when applied, induce an AI model to provide content such as a script for the video. (i.e. Please provide me with a script for the video with X, Y, and Z scenes based on A, B, and C).

At 414, the method 400 may further include generating creation tools 415. The creation tools 415 may be the creation tools 256 of FIG. 2. The creation tools 415 may be generated via the creation module 254 of FIG. 2. The creation tools 415 are tools to create the creative data 417, further described below.

The creation tools 415 generate an interface to implement the recommendations. The interface may include a GUI or backend interface for receiving input, such as, from the client 401.

In an embodiment, the interface is the GUI 500 depicted in FIG. 5. In this embodiment, the creation tools 415 are further configured to display a representation of the creative data 417 via the GUI.

In a further embodiment, the interface is configured to receive the recommendations automatically (i.e. without client input). For example, the creation tool 415 may receive the recommendations directly from the recommendations module.

At 416, the method 400, further includes creating creative data 417. Creating the creative data 417 includes generating the data of the creative data 417 based on the recommendations. The creative data 417 includes instructions or data for implementing the recommendations of the recommendations data 411 such as the creative content 248, instructions 250, or talent data 252 of FIG. 2. The creative data 417 is saved in the campaign data 407.

Creating the creative data 417 includes executing the creation tools 415. Executing the creation tools 415 causes a processor of the system to obtain recommendations and apply the recommendations to a creation model to obtain the creative data 417. In an example, a recommendations data 411 includes a first shot list and a corresponding first prompt as recommendations. The first prompt is applied to the creation model which causes the creation model to create and return a creative data 417 including a first script. An example of a representation of creative data 417 may be the creative data representation displayed in the display panel 506 of FIG. 5.

The recommendations obtained for creating the creative data 417 are based on the recommendations of the recommendations data 411. It will be appreciated that the recommendations obtained for creating the creative data 417 may be a subset of the recommendations of the recommendations data 411. For example, the client 401 may select specific recommendations of the recommendations data 411 to provide to the creation module for implementation. The client 401 input (i.e. selection) is received via the GUI of the creation tool 415. In a further example, creating the creative data 417 is automatic (i.e. without client 401 input). In this embodiment, the creation module is provided with the recommendations data 411 directly. The creation tool may select a recommendation subset of the recommendations data 411 based, for example, on an API of the creation tool 415 and/or a ranking of the recommendations data 411.

Generating the creative data 417 may further include obtaining and applying sourced data 413, to the creation model.

At 418, the creative data 417 is evaluated to determine if the creative data 417 is in progress or approved for posting. The evaluation may be via an evaluation module such as the evaluation module 260 of FIG. 2. In some embodiments the evaluation is automatic (I.e. without client input). In these embodiments, the evaluation may be according to a model of the evaluation module. The evaluation of the creative data 417 may be similar to the generation of the goals and objectives.

The evaluation may include determining if, according to the evaluation model, the creative data 417 is projected to accomplish the goals and objectives. This projection may be according to the metrics (criteria and thresholds) of the campaign data 407.

Evaluating the creative data 418 may further include applying the Sourced Data 413 to the evaluation model.

In some embodiments, the evaluation module provides interface based on the creative data 417 to the client 401. The interface allows the client to access, review, evaluate and provide input based on the creative data 417. For example, the evaluation module may generate a GUI to display the creative data 417 and receive a client 401 input based on the creative data 417. The GUI may be the GUI 500 of FIG. 5. The client 401 input may be an approval of the creative data 417 for posting, as further described below. The client 401 input may further be an input for refining the creative data 417 such as edits or selection of the creative feedback 421, as further described below.

In some instances, the creative data 417 may include an indication that the creative data 417 is in progress. For example, the creative data 417 may include one or more prompts requesting more input information to apply to the creation model. Returning to the cooking video example, the creative data 417 may include a prompt inquiring if the cooking video is intended for mature audiences. It will be appreciated the creative data 417 including an indication the creative data 417 is in progress is not mutually exclusive of the creative data 417 also including data sufficient to proceed to posting. In these instances, the campaign data 407 may be provided to the client 401 or applied to the evaluation model to determine if the creative data 417 is in progress or approved for posting.

In an example, a first creative data 417 is created, at 416, based on a first recommendations data 411. The first creative data 417 includes first creation prompts indicating requests for additional information. At 418, the first creative data 417 is determined to be in progress and is provided to the creative feedback module.

In some embodiments, the creative data 417 is evaluated based on a quality of the of the creative data. For example, the evaluation model may include a security model that evaluates the creative data 417 based on alignment of the creative data 417 with brand and image metrics of the customer profile 403. In some embodiments, the creative data is evaluated based on quality metrics such as data size or content dimensions.

In an example, a first creative data 417 is created, at 416, based on a first recommendations data 411. The first creative data 417 includes alcohol images which are flagged as not consistent with an image of the client 401. At 418, the first creative data 417 is determined to be in progress and an indication that is the content should not include alcohol related content is provided as creative feedback 421, further described below, to the creative feedback module.

At 420, where the creative data 417 is determined to be in progress, the method 400, includes obtaining a creative feedback 421. Obtaining the creative feedback 421 includes receiving the creative data 417.

Obtaining the creative feedback 421 may further include evaluating the received creative data 417. The evaluation is to determine the portion of the creative data 417 to be applied as creative feedback 421 for recommendation generation. Based on the determination, portions of the creative data 417 may be extracted and/or modified for inclusion in the creative feedback 421.

The evaluation may be according to models and modules similar to those of the campaign generation module. The evaluation of the creative data 417 may be further based on additional inputs such as the goals and objectives, client 401 input, first party client data 405, sourced data 413, and the like.

In an example, a first creative data 417 is received. The first creative data 417 includes a request prompting the client 401 to indicate if the requested video content is intended for mature audiences. This request is evaluated as creative feedback 421 based on a predetermined model indicating any requests for information are creative feedback 421. The request is saved in the creative feedback 421.

Obtaining the creative feedback 421 further includes providing the creative feedback 421, for example, to the recommendations module. Providing the creative feedback 421 will cause the system to repeat at 410, 416, and 418. This cycle may repeat for multiple instances until the creative data 417 is approved.

Continuing the above example, receiving the creative feedback 421 triggers the recommendations module to update the first recommendations data 411 to obtain a second recommendations data 411 based on at least the goals and objectives of the campaign data 407 and the creative feedback 421. A second creative data 417 is created based on the second recommendations data 411 where the second creative data 417 includes a script and does not include any prompts. The second creative data 417 is approved for posting.

It is expressly contemplated that in some examples the evaluation at 418 may determine that the creative data 417 indicates an adjustment of the campaign data 407 such as the goals and objectives. In such examples, generating the creative feedback at 420 may include indicating this determination in the creative feedback 421 and providing the creative feedback 421 to, for example, the campaign generation module. In these embodiments an update or recreation of the campaign data 407 is triggered in addition to the updates of the recommendations data 410 and the creative data 417, described above.

At 422, the method 400 includes posting the creative data 422. Posting the creative data 422 includes communicating the content of the creative data 417 according to the instructions of the creative data 417.

In some embodiments the posting may include creating post ready content based on the creative data 417. For example, the creative data 417 may include a script for a video. Posting the creative data 417 may include recording the video by the client 401. In a further example, where the recommendations data 411 includes an influencer recommendation, posting the creative data 417 may include engaging, by the client 401, the influencer to record the video. The engagement may include, for example, executing on talent data of the creative data 417. Continuing the previous example, engaging the influencer may include executing a contract corresponding to the influencer stored in the talent data.

Posting further includes implementing instructions of the creative data 417. Implementing the instructions communicates a representation of the content of the creative data 417. Implementing the instructions may be done via client 401 input or automatically such as via a posting module. The system may interface with a platform of various channels to implement the instructions. In an example the instructions include instructions to post various and multiple postings of various content of the creative data 417 via various and multiple channels.

In an example, posting the creative data 422 includes posting the creative data 422 or post ready content produced therefrom, on a particular channel indicated in the instructions of the creative data 422. In a further example, posting includes removing or modifying existing posts.

At 424, the method 400 may include evaluating the campaign. Evaluating the campaign includes determining if the postings, at 422, have achieved the goals and objectives (i.e. satisfying the metrics) of the campaign. This determination includes applying the goals and objectives of the campaign data 407 to a campaign evaluation model. This determination further includes applying data indicating the effect of the campaign to the campaign evaluation model. This indicating data may include sourced data 413 and/or first party client data 405.

It will be appreciated that achieving the goals may be dynamic. Therefore, the evaluation of the campaign may be performed at a predetermined time in the campaign or periodically. Context such as time or location may be incorporated into the evaluation and the metrics may be established according to the context.

Where the campaign is determined not to have achieved the goals and objectives, evaluating the campaign further includes creating a success data 425. The success data 425 indicates the success of the campaign relative to the goals and objectives.

Evaluating the campaign further includes providing the success data 425 to, for example, the recommendations data 410. Providing the success data 425 triggers an update of the recommendation data 407, for example by recreating the recommendations, at 410. The recreation is based on the success data 425 including the goals and objectives of the campaign data 407 and the corresponding indications of success. Recreating the recommendations further triggers the execution of 416 through 422 effectively updating the creative data 417.

The evaluation of the creative data 417 may be repeated for each updated campaign. In an embodiment, where the goals and objectives are determined to have been met the campaign may be considered complete.

In a further embodiment, the campaign data 407 may be updated with new goals and objectives or new metrics for the goals and objectives. In this embodiment, the evaluation of the campaign is repeated to obtain a new success data.

While the above description provides examples of one or more apparatus, methods, or systems, it will be appreciated that other apparatus, methods, or systems may be within the scope of the claims as interpreted by one of skill in the art.

The invention claimed is:

1. A system for generating and posting tailored digital content comprising:

at least one non-transitory memory configured to store:

a campaign data; and
model data; and at least one processor, at one or more server computers, communicatively connected to the at least one memory configured to implement:

an acquisition module, stored in the at least one memory, configured to:

acquire data from various sources, wherein the acquisition module includes a preprocessing module configured to preprocess the acquired data according to at least one adaptive content analysis model, wherein the preprocessing includes converting the acquired data from the acquired data in an acquired format to goals application data in a second format:

a goals and objectives module, stored in the at least one memory, configured to:

apply the goals application data to a goals application model;

generate goals and objectives data via the goals application model based on the applied goals application data; and provide the goals and objectives data to a recommendations module;

the recommendations module, stored in the at least one memory, configured to:

receive and apply the goals and objectives data and, where provided, a creative feedback to a recommendations model;

generate a recommendations data via the execution of the recommendations model based on the applied goals data and, where received, the creative feedback, the recommendations data comprising at least one engineered prompt;

provide the recommendations data to a creations module stored in the at least one memory; and where a creative feedback is received, dynamically update the recommendations model based on the creative feedback;

an evaluation module configured to:

receive a creative data from the creations module;

evaluate the creative data to determine a status of the creative data wherein the status indicates if a creative data is in progress; and where the status indicates that the creative data is progress, generate and provide to the recommendations modules, the creative feedback based on the status.

2. The system of claim 1, wherein the campaign data includes at least one of: the goals application data; the goals and objectives data; recommendations data; and creative feedback data.

3. The system of claim 1, wherein the model data includes at least one of: the goals application model; and the recommendations model.

4. The system of claim 1, wherein the processor further comprises a posting module, stored in the at least one memory, configured to post creative content.

5. The system of claim 1, wherein the processor further comprises an onboarding module, stored in the at least one memory, configured to onboard a client.

6. The system of claim 1, wherein at least one adaptive content analysis model includes a predetermined mapping, wherein the predetermined mapping is an aspect-ontology mapping.

7. The system of claim 1, wherein executing the at least one adaptive content analysis model updates the at least one adaptive content analysis model.

8. The system of claim 1, wherein the processor further comprises a campaign evaluation module stored in the at least one memory configured to evaluate the success of a campaign, generate corresponding success data, and provide the success data to the goals and objectives module.

9. A method for generating and posting tailored digital content, the method comprising executing via a computer system comprising at least one processor and at least one non-transitory memory:

acquiring, by the processor, data from various sources, wherein the acquiring includes preprocessing the acquired data according to at least one adaptive content analysis model, wherein the preprocessing includes converting the acquired data from the acquired data in an acquired format to goals application data in a second format;

applying the goals application data to a goals application model;

generating, by the processor, goals and objectives data via the goals application model based on the applied goals application data;

providing, by the processor, the goals and objectives data to a recommendations module;

receiving and applying, by the processor, the goals and objectives data and, where provided, a creative feedback to a recommendations model;

generating, by the processor, a recommendations data via the execution of the recommendations model based on the applied goals data and, where received, the creative feedback, the recommendations data comprising at least one engineered prompt;

providing, by the processor, the recommendations data to a creations module;

where a creative feedback is received, dynamically updating, by the processor, the recommendations model based on the creative feedback;

receiving, by the processor, a creative data from the creations module;

evaluating, by the processor, the creative data to determine a status of the creative data wherein the status indicates if a creative data is in progress; and where the status indicates that the creative data is progress, generating and providing, by the processor, to the recommendations modules, the creative feedback based on the status.

10. The method of claim 9, further comprising posting creative content.

11. The method of claim 9, further comprising onboarding a client.

12. The method of claim 9, wherein the at least one adaptive content analysis model includes a predetermined mapping, wherein the predetermined mapping is an aspect-ontology mapping.

13. The method of claim 9, wherein executing the at least one adaptive content analysis model updates the at least one adaptive content analysis model.

14. The method of claim 9, further comprising evaluating the success of a campaign, generating corresponding success data, and providing the success data to the goals and objectives module.

15. A device comprising:

a network interface;

a processor;

a non-transitory memory having stored thereon computer-executable instructions which, when executed by the processor, configure the device to:

acquire data from various sources, wherein the acquiring includes preprocessing the acquired data according to at least one adaptive content analysis model, wherein the preprocessing includes converting the acquired data from the acquired data in an acquired format to goals application data in a second format;

apply goals application data to a goals application model;

generate goals and objectives data via the goals application model based on the applied goals application data;

provide the goals and objectives data to a recommendations module stored in the at least one memory;

receive and apply the goals and objectives data and, where provided, a creative feedback to a recommendations model;

generate a recommendations data via the execution of the recommendations model based on the applied goals data and, where received, the creative feedback, the recommendations data comprising at least one engineered prompt;

provide the recommendations data to a creations module stored in the at least one memory;

where a creative feedback is received, dynamically update the recommendations model based on the creative feedback;

receive a creative data from the creations module;

evaluate the creative data to determine a status of the creative data wherein the status indicates if a creative data is in progress; and where the status indicates that the creative data is progress, generate and provide to the recommendations modules, the creative feedback based on the status.

16. The device of claim 15, wherein the device is further configured to post creative content.

17. The device of claim 15, wherein the device is further configured to onboard a client.

18. The device of claim 15, wherein the at least one adaptive content analysis model includes a predetermined mapping, wherein the predetermined mapping is an aspect-ontology mapping.

19. The device of claim 15, wherein executing the at least one adaptive content analysis model updates the at least one adaptive content analysis model.

20. The device of claim 15, wherein the device is further configured to evaluate the success of a campaign, generate corresponding success data, and provide the success data to the goals and objectives module.

* * * * *